United States Patent [19]
Shinohara

[11] Patent Number: 5,457,567
[45] Date of Patent: Oct. 10, 1995

[54] LASER SCANNER HAVING IMPROVED FREQUENCY CHARACTERISTICS

[75] Inventor: Kouichirou Shinohara, Kanagawa, Japan

[73] Assignee: Fuji Xerox Co., Ltd., Tokyo, Japan

[21] Appl. No.: 980,882

[22] Filed: Nov. 24, 1992

[30] Foreign Application Priority Data

Nov. 25, 1991 [JP] Japan ..................... 3-309333

[51] Int. Cl.⁶ ........................................ G02F 1/33
[52] U.S. Cl. .................. 359/305; 359/285; 359/216
[58] Field of Search .................... 359/219, 218, 359/217, 216, 285, 305, 602; 358/481

[56] References Cited

U.S. PATENT DOCUMENTS

| | | | |
|---|---|---|---|
| 3,424,906 | 1/1969 | Korpel | 359/305 |
| 4,101,193 | 7/1978 | Waterworth et al. | 358/481 |
| 4,170,028 | 10/1979 | De Benedictus et al. | |
| 4,205,348 | 5/1980 | De Benedictus et al. | |
| 4,213,158 | 7/1980 | De Benedictus et al. | |
| 4,253,725 | 3/1981 | Johnson | |
| 4,284,994 | 8/1981 | Radl | 359/218 |
| 4,357,627 | 11/1982 | Johnson | |
| 4,404,596 | 9/1983 | Juergensen et al. | 358/481 |
| 4,639,073 | 1/1987 | Yip et al. | |
| 4,771,337 | 9/1988 | Endo et al. | 358/481 |

*Primary Examiner*—Georgia Y. Epps
*Assistant Examiner*—Thomas Robbins
*Attorney, Agent, or Firm*—Finnegan, Henderson, Farabow, Garrett & Dunner

[57] ABSTRACT

A laser scanner is disclosed, in which M, the lateral magnification obtained from the first and the second optical members, $V_1$, the scanning velocity of the scanning beam on the beam receiving surface and $V_s$, the velocity of the acoustic wave inside the acoustic beam modulator are substantially related by $M=-V_1/V_s$, comprising a laser beam emitter, an acoustic optical modulator which generates an acoustic wave having a specified direction of progression to modulate a laser beam emitted from the laser beam emitter and obtain a primary diffracted beam, a first optical member to make the primary diffracted beam a collimated beam, a beam deflecting means to deflect the collimated beam to make it a scanning beam, a second optical member to focus the scanning beam, a receiving surface positioned so that it is in a conjugate position with the acoustic optical modulator with respect to the first and the second optical members, and an aperture means positioned between the first optical member and the beam deflecting means and which restricts the beam in the direction of progression of the acoustic wave across the collimated beam, having a condenser lens which collects the laser beam emitted from the laser beam emitter in the acoustic optical modulator and in which an fθ lens is the second optical member.

4 Claims, 10 Drawing Sheets

LASER SCANNER HAVING IMPROVED FREQUENCY CHARACTERISTICS

FIELD OF THE INVENTION

This invention relates to a laser scanner employing a rotating polygonal mirror and having improved frequency characteristics for an electrophotographic printer, a copying machine or the like.

BACKGROUND OF THE INVENTION

In an electrophotographic printer or a copying machine, an image corresponding to image data is formed on a photosensitive member by using a laser scanning system. The optical resolution of a laser scanner depends on the point spread function of the laser beam impinging on an image forming surface.

This point spread function is similar to a Gaussian distribution. The energy distribution in the image forming surface is determined by the convolutional integral of the point spread function and the input signal function. To obtain a contrast of 100 percent in the image forming surface, the beam diameter of the laser beam in the image forming surface must be 0. As this would entail the point spread function here being a delta function, it is physically impossible.

Figure 10:
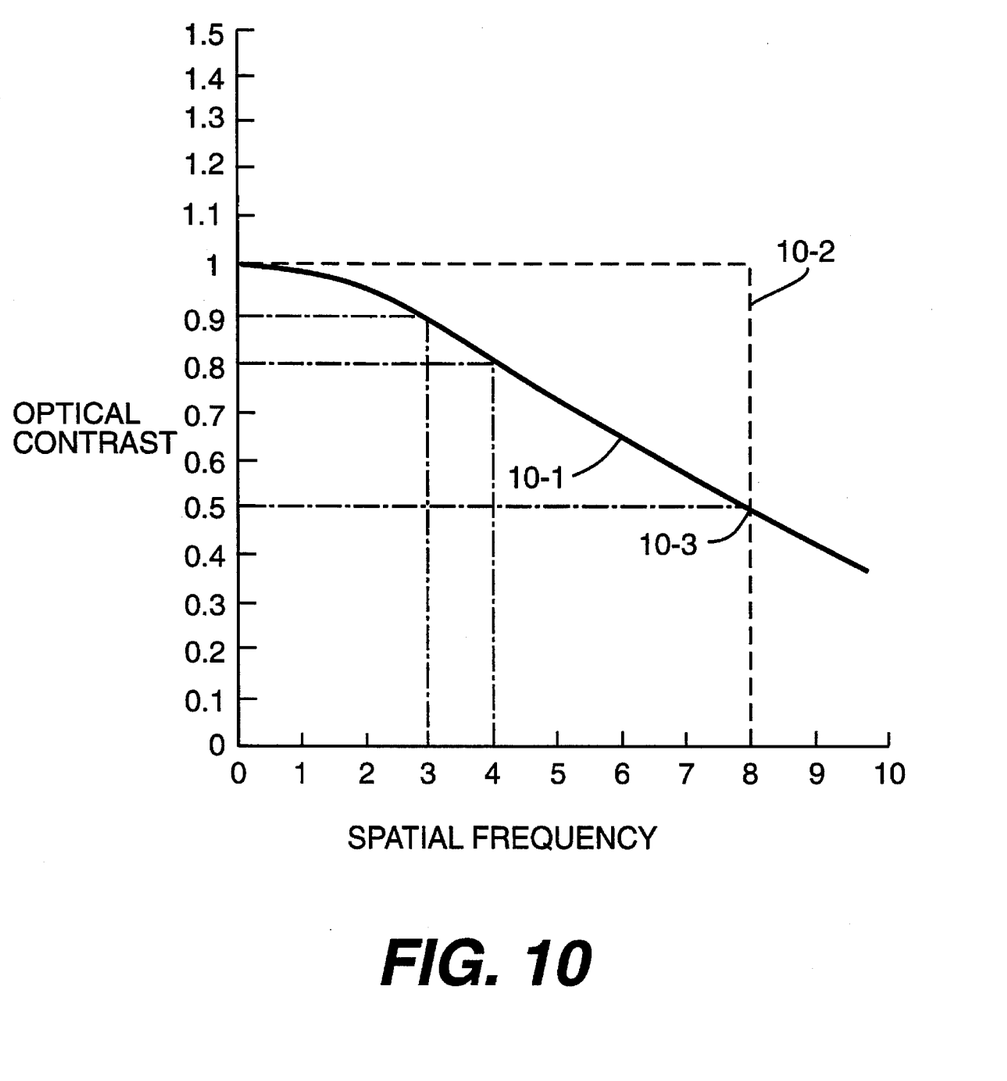
FIG. 10 shows the spatial frequency characteristics of a laser scanner in the conventional art.

FIG. 10 shows the spatial frequency characteristics of the optical contrast of a laser scanner in the conventional art, and it illustrates an example of the optical contrast in the image forming surface. In this figure, the $1/e^2$ beam diameter of the laser in the image forming surface is 80 μm, the x-axis represents the spatial frequency (lp/mm: line-pairs per mm), and the y-axis represents the optical contrast in the image forming surface.

As shown by the continuous line 10-1, the optical contrast in the image forming surface when the spatial frequency is 8 lp/mm, which means the corresponding optical resolution is 16 dot/mm, is 0.5 approximately.

If the required contrast in the image forming surface at the threshold frequency is 80 percent and the point spread function in the image forming surface of the static optical system is a perfect Gaussian distribution, the required beam diameter is about 40 μm.

If the required contrast is 90 percent, the beam diameter must be 30 μm or less, as the higher the required contrast is, the smaller the beam diameter is required to be. If the beam diameter is required to be too small, it is not implementable in practice.

In the conventional art, the laser scanner also has a relatively high contrast in the spatial frequency range where it is not required, viz. above 8 lp/mm in FIG. 10, and the optical system also provides unnecessary contrast for high frequency noise included for example in the drive signal to an acoustic optical modulator. With this type of optical system it is not possible in principle to obtain the ideal contrast characteristics, shown by the broken line 10-2 in FIG. 10.

Japanese unexamined patent publication Sho 55-36893 discloses prior art related to this kind of scanner. In the scanner disclosed in this publication, an acoustic optical modulator is used as a modulating means supplied with image data, and an image focusing lens is positioned between the acoustic optical modulator and a rotating polygonal mirror, M is the lateral magnification of the image focusing lens, $V_1$ is the scanning velocity and $V_s$ is the acoustic wave propagation velocity inside the acoustic optical modulator. The contrast is improved by making $M=-V_1/V_s$.

As described above, it is impossible to obtain a good frequency response in the conventional art, because of the limits in principle to the contrast of the image formed in the image forming surface, and the frequency characteristics are inevitably similar to those shown by the continuous line 10-1 in FIG. 10.

Although the scanner disclosed in the above described publication has good high-frequency characteristics by exploiting the coherence of the scanning beam, as the image focusing lens is positioned before the rotating polygonal mirror, there is a large fluctuation in the light quantity of the laser beam in the image forming surface and in the frequency response of the laser beam. Thus, to obtain stable characteristics, the facets of the rotating polygonal mirror must be large.

SUMMARY OF THE INVENTION

It is an object of the present invention to provide a laser scanner free of the defects found in the conventional art.

It is another object of the present invention to provide a laser scanner which has a high contrast and sharp frequency cut-off characteristics as shown by a broken line 10-2 in FIG. 10.

It is a yet further object of the present invention to provide a laser scanner having improved frequency characteristics whose fluctuation in light quantity and frequency response in the image forming surface is extremely small and to improve the reproduced image quality.

This invention relates to a laser scanner having a laser beam emitter, an acoustic optical modulator which generates an acoustic wave having a specified direction of progression to modulate a laser beam emitted from the laser beam emitter and obtain a primary diffracted beam, a first optical member to make the primary diffracted beam a collimated beam, a beam deflecting means to deflect the collimated beam to make it a scanning beam, a second optical member to condense the scanning beam, a receiving surface positioned so that it is in a conjugate position with the acoustic optical modulator with respect to the first and the second optical members, and an aperture means positioned between the first optical member and the beam deflecting means and which restricts the beam in the direction of progression of the acoustic wave across the collimated beam.

This invention also relates to a laser scanner having a condenser lens which collects the laser beam emitted from the laser beam emitter in the acoustic optical modulator.

This invention further relates to a laser scanner in which M, the lateral magnification obtained from the first and the second optical members, $V_1$, the scanning velocity of the scanning beam on the beam receiving surface and $V_s$, the velocity of the acoustic wave inside the acoustic beam modulator are substantially related by $M=-V_1/V_s$.

This invention yet further relates to a laser scanner in which an fθ lens is the second optical member.

DETAILED DESCRIPTION OF THE INVENTION

In this invention, good frequency characteristics are obtained exploiting the coherence of the laser beam up to a threshold frequency. In this invention, as shown in the schematic view of the optical system of FIG. 2, a laser beam 1—1 is collected in an acoustic optical modulator 3 by a condenser lens 2, and is modulated by an input signal (image signal) applied to this acoustic optical modulator 3.

Figure 1:
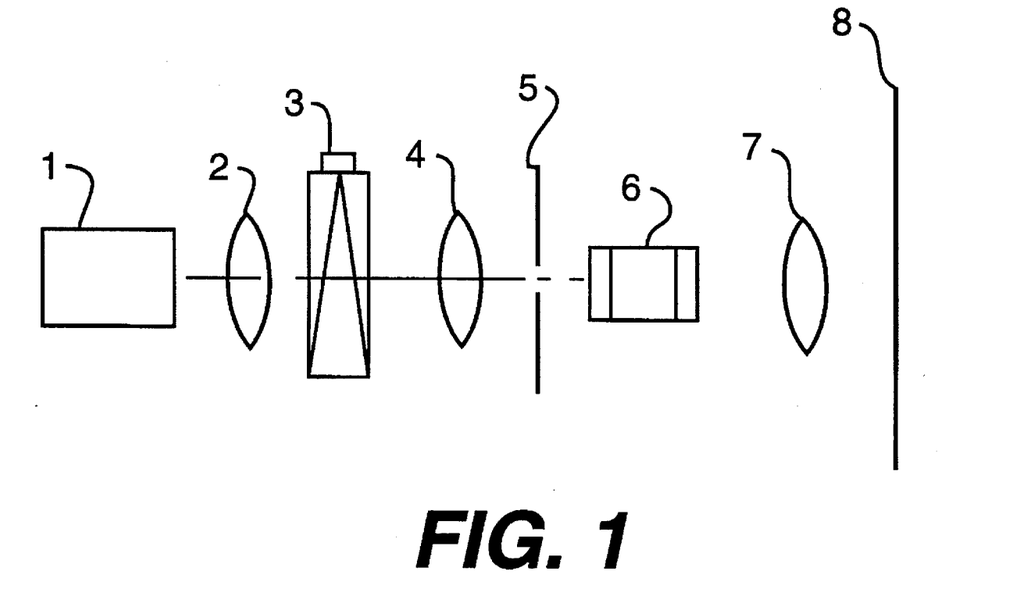
FIG. 1 shows the basic structure of a laser scanner having improved frequency characteristics of this invention.
Figure 2:
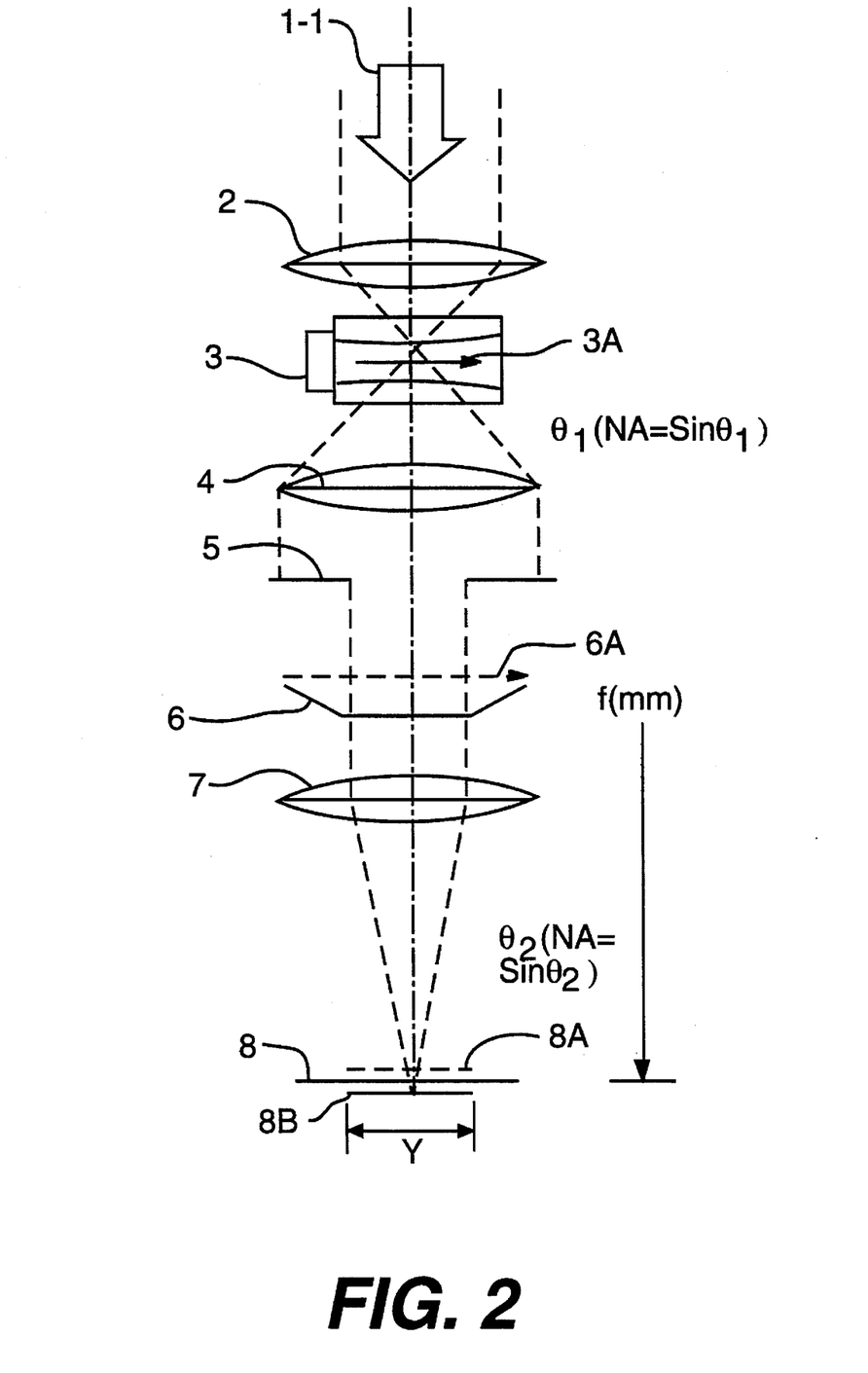
FIG. 2 is a schematic view of the optical system of a laser scanner having improved frequency characteristics of this invention.

The laser beam modulated in the acoustic optical modulator 3 is projected onto the image forming surface 8 through a first image focusing lens group 4, a rotating polygonal mirror 6 and a second image focusing lens group 7, forming a projected image.

In FIG. 2, arrow 3A indicates the direction of progression of the acoustic wave in the acoustic optical modulator, arrow 6A indicates the direction of rotation of the polygonal mirror 6, and arrow 8A indicates the direction of movement of the laser beam.

The acoustic optical modulator 3 and the image forming surface 8 are positioned in conjugate positions with respect to the first image focusing lens group 4 and the second image focusing lens group 7. $M_1$ is the optical lateral magnification of the image focusing lens system, $V_1$ (m/sec) is the scanning velocity of the laser beam in the image forming surface 8 scanned by the rotating polygonal mirror 6, and $V_s$ is the acoustic wave propagation velocity (m/sec) inside the acoustic optical modulator 3. Here, it is specified that $M_1 r=V_1/V_s$.

An aperture means 5 is positioned between the first image focusing lens group 4 and the rotating polygonal mirror 6 to improve the frequency characteristics, and this arrangement acts as a coherent optical system for the acoustic optical modulator 3. Therefore, except for optical aberration and the like, the frequency response of this optical system up to the threshold frequency is in principle about 100 percent.

The coherence coefficient of the acoustic optical modulator 3 depends on the numerical aperture of the condenser lens 2 and that of an object point of the first condenser lens group, but the contrast is not influenced by the spherical aberration of the condenser lens 2.

It is preferable that the laser beam spot focused on the acoustic optical modulator 3 through the condenser lens 2 falls entirely within the modulation window of the acoustic optical modulator of the acoustic optical modulator 3.

EMBODIMENT

Figure 3:
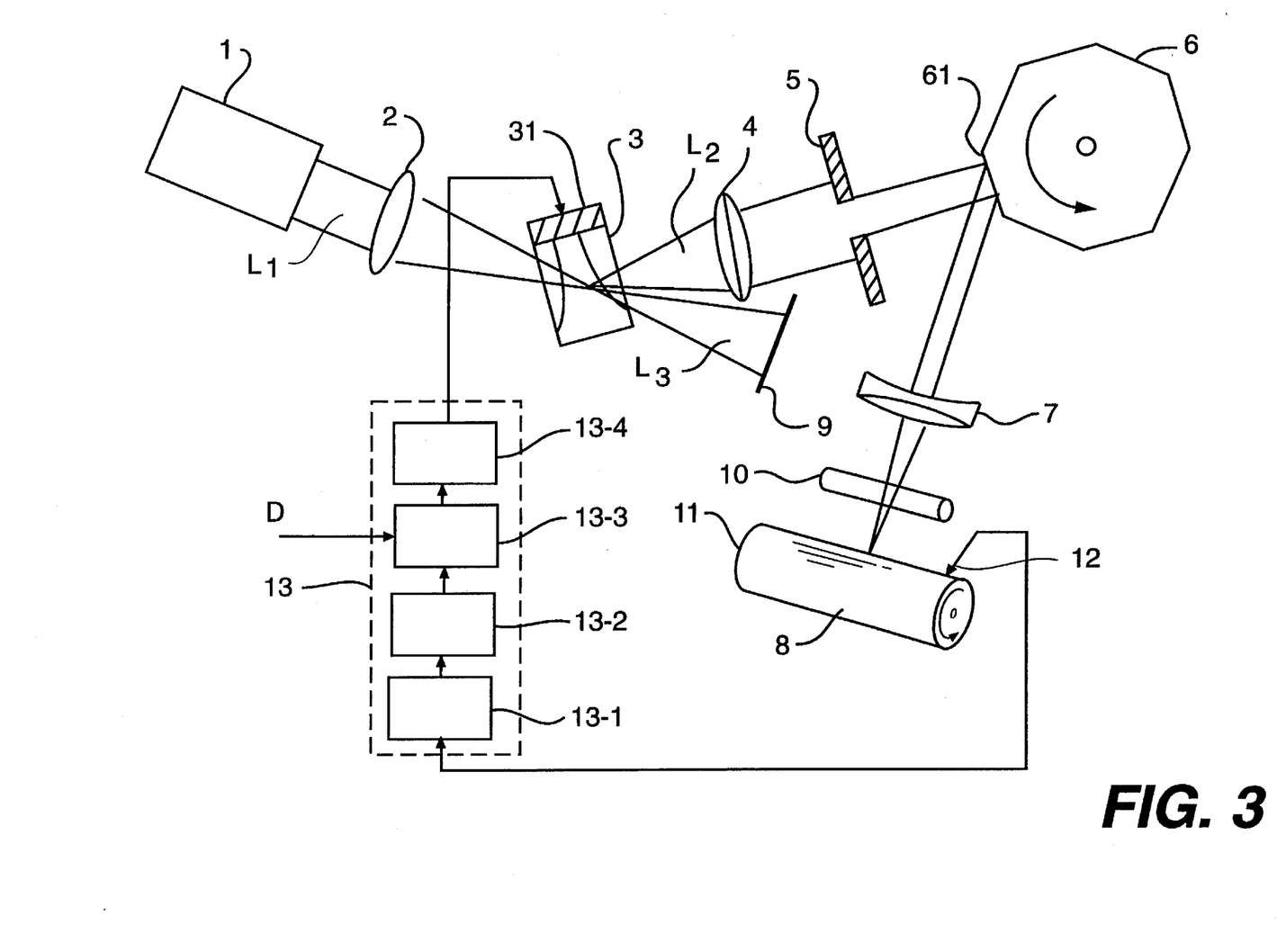
FIG. 3 is a schematic view illustrating the structure of a laser printer to which the laser scanner having improved frequency characteristics of this invention is applied.

FIG. 3 illustrates the structure of a laser printer to which the laser scanner having improved frequency characteristics of this invention is applied. In this figure, 1 is a laser beam emitter, 2 is a condenser lens, 3 is an acoustic optical modulator, 4 is a first image focusing lens group, 5 is an aperture means, 6 is a rotating polygonal mirror, 7 is a second image focusing lens group, 8 is an image forming surface, 9 is a beam stopper, 10 is an fθ lens, 11 is a photosensitive member, 12 is a laser beam detector and 13 is a control circuit.

The control circuit has a sawtooth voltage generator 13-1 which is triggered under the control of a detecting signal of the laser beam detector 12, a voltage control generator 13-2 which produces an RF signal whose frequency is controlled based on the output voltage of this sawtooth voltage generator, a RF mixer 13-3 which mixes the output of the voltage control generator 13-2 and an input signal (image data) D, and an amplifier 13-4 which amplifies the output voltage of the RF mixer 13-3 to drive the transducer 31 of the acoustic optical modulator 3. The transducer 31 generates an acoustic wave corresponding to the applied voltage, the acoustic wave is propagated into the window of the acoustic optical modulator 3 and it progresses in the direction shown by an arrow.

A laser beam $L_1$ emitted from the laser beam emitter is collected in the modulation window of the acoustic optical modulator 3 by the condenser lens 2. When the transducer 31 is driven by the input of an input signal D, the laser beam is diffracted corresponding to the intensity of the input signal, and the primary diffracted laser beam, in other words, modulated laser beam $L_2$ is formed into a parallel beam in the first image focusing lens group 4 and then it is projected onto a reflecting mirror surface 61 of the rotating polygonal mirror 6 through an aperture means 5. The nondiffracted beam is absorbed by a beam stopper 9.

The modulated laser beam $L_2$ which passes the aperture means 5 is reflected by a facet 61 of the rotating polygonal mirror 6 and is focused on the second image focusing lens group 7. Rotation of the polygonal mirror 6 is accompanied by a change in the reflection angle for the laser beam $L_2$ of the facet 61, and the laser beam $L_2$ scans in the fast scan direction along the axis surface of the photosensitive member and forms a two-dimensional scan image together with the slow scan in the direction of rotation of the photosensitive member 11.

Figure 4:
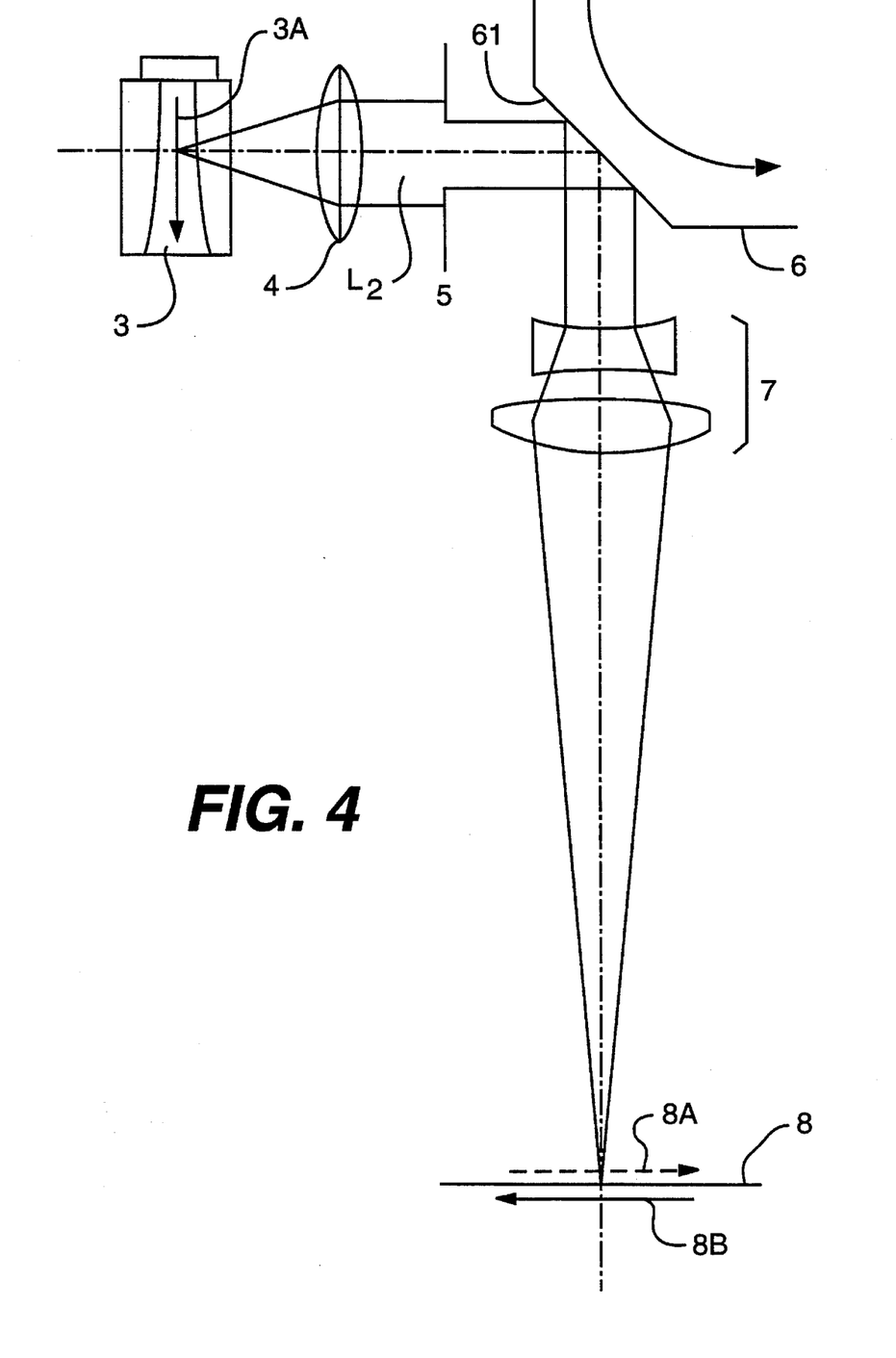
FIG. 4 is a plan view of the main optical system of an embodiment of this invention.

FIG. 4 shows the main optical system of this embodiment, and in it, portions are identified by the same reference indications as in FIGS. 2 and 3.

In FIG. 4, as in FIG. 3, the modulated laser beam $L_2$ emitted from the acoustic optical modulator 3 is formed into a parallel beam in the first image focusing lens group 4 and then it is projected onto a reflecting mirror surface 61 of the rotating polygonal mirror 6 after being restricted by the aperture means 5.

The modulated laser beam $L_2$ reflected by the reflecting mirror surface 61 of the rotating polygonal mirror 6 is converged by the second image focusing lens group 7 and the image is focused in the image forming surface 8.

The aperture means 5 is a slit and it improves the frequency characteristics in the fast scan direction of the modulated laser beam $L_2$ and the contrast performance. The optical system of this invention improves the above described performance of the component in the fast scan direction of the modulated laser beam $L_2$ and the above described performance of the component in the slow scan direction of the modulated beam $L_2$ is the same as that in the conventional art. Even if the shape of the aperture means 5 is different, for example circular instead of a slit as in this embodiment, the effect is the same.

Generally, the optical resolution $R_0$ required for the scanning system is:

$$R_0 = 8 \text{ lp/mm} \tag{1}$$

Here, the effective aperture A of the second image focusing lens group 7 with an aperture means 5 is:

$$A = f/52 \tag{2}$$

and RNA, the numerical aperture ratio, obtained by dividing the numerical aperture (numerical aperture=sin θ) of the condenser lens 2 in the acoustic optical modulator 3 shown in FIG. 3 by the numerical aperture of the second image focusing group 7 is:

$$RNA = .156 \tag{3}$$

The aperture means 5 is disposed symmetrically about the optical axis in the direction of orientation of the acoustic optical modulator.

Figure 5:
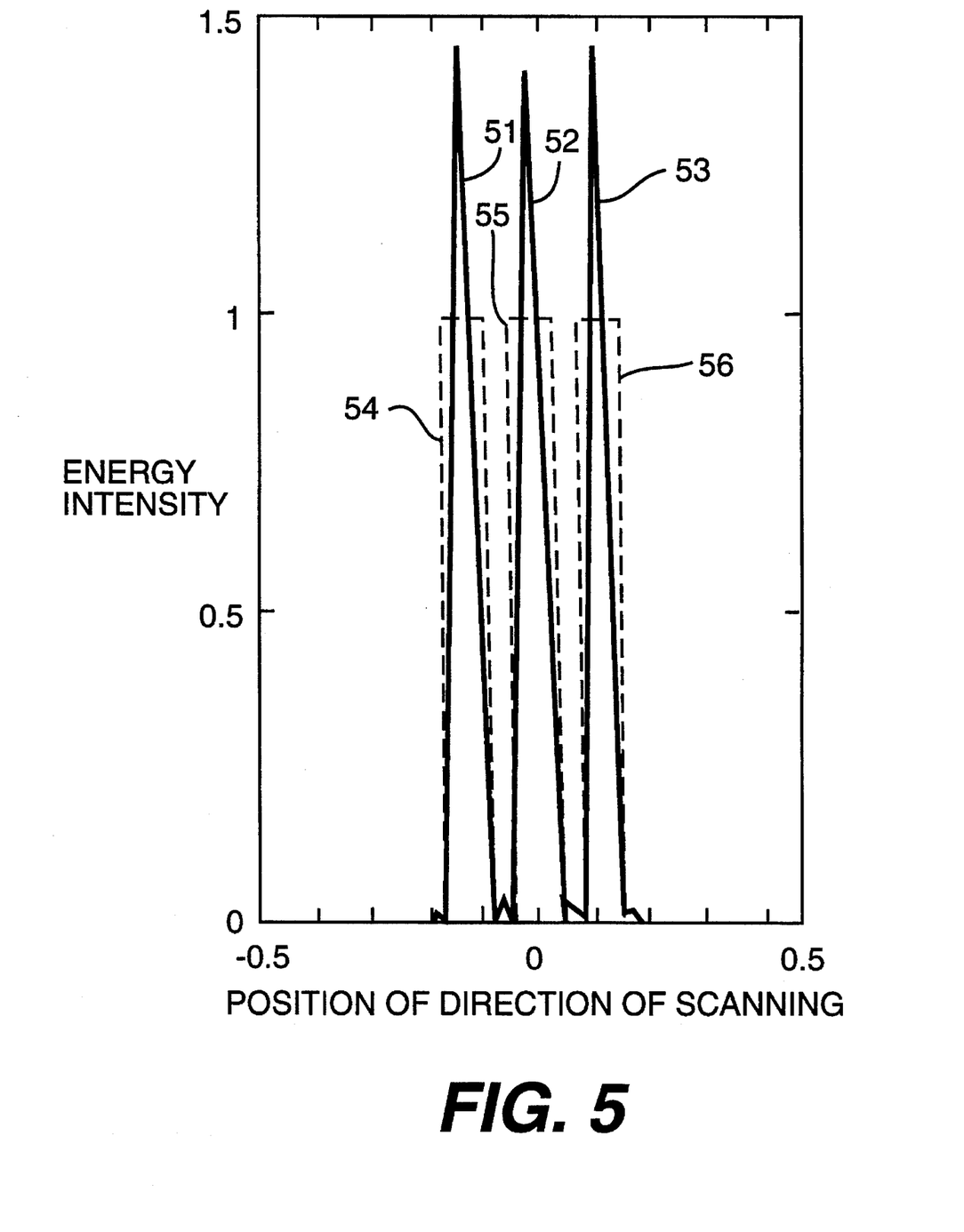
FIG. 5 shows the optical response characteristics corresponding to an input of a 3-bar test signal having a threshold frequency of 8 lp/mm and a duty factor of 50 percent.

FIG. 5 illustrates the optical response for the input of a 3-bar test signal having a spatial frequency of 8 lp/mm and a duty factor of 50 percent under the conditions (1), (2) and (3). As the optical response is approximately that of a perfect coherent optical system as shown by the continuous line 51, 52 and 53, it means high optical response is obtained. The broken line 54, 55 and 56 shows the intensity level of the laser beam during the continuous operation of the laser.

Figure 6:
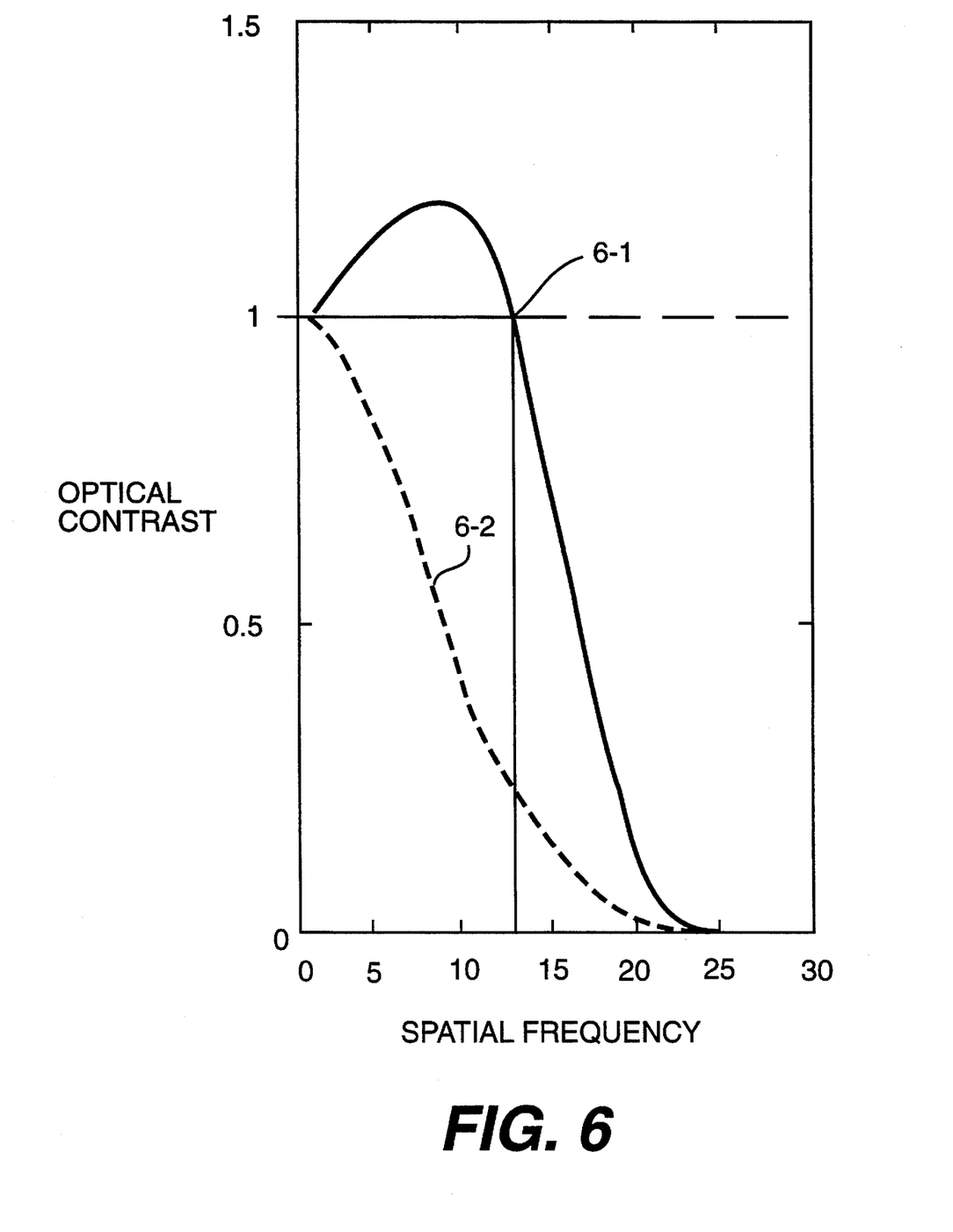
FIG. 6 shows the spatial frequency response of the scanner.

FIG. 6 shows curves which are least squares approximations based on results obtained by applying the same calculation as above to various frequencies, and in it, the continuous line 6-1 shows the spatial frequency response (optical contrast) and the broken line 6-2 shows the spatial frequency response of the same laser beam having a diameter of 80 μm shown by the continuous line 10-1 in FIG. 10. In an actual printing system, the response of the acoustic optical modulator 3 needs to be considered in addition to the spatial frequency characteristics shown in FIG. 6.

In this embodiment, the scanning velocity $V_1$ of the modulated laser beam in the image forming surface 8 is:

$$V_1 = 1.000 \text{ m/s} \tag{4}$$

The acoustic optical modulator 3 comprises tellurium dioxide as a crystal material and has a carrier frequency of 110 MHz. The velocity $V_s$ of the acoustic wave progressing inside this acoustic optical modulator 3 is:

$$V_s = 4.260 \text{ m/s} \tag{5}$$

and the lateral magnification M of the optical system for the case requiring the optically highest frequency response needs to be:

$$M = -V_1/V_s = -0.235 \tag{6}$$

The relation between the carrier of the acoustic optical modulator and the response, in which the carrier impairs the response, is the same as the relation of the carrier frequency and the modulation response in the known amplitude modulation process.

Figure 7:
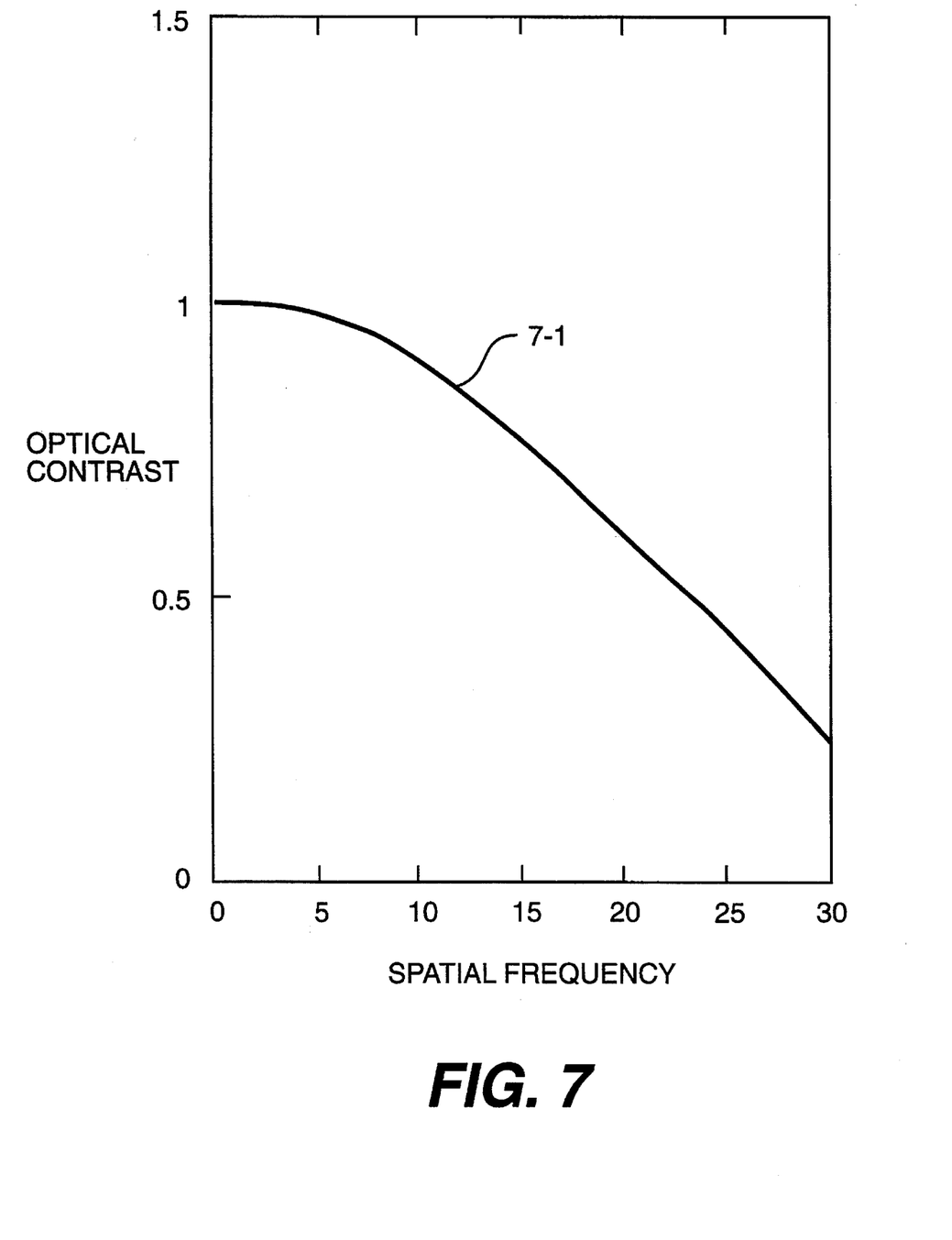
FIG. 7 shows the spatial frequency response of an acoustic optical modulator carrier.
Figure 8:
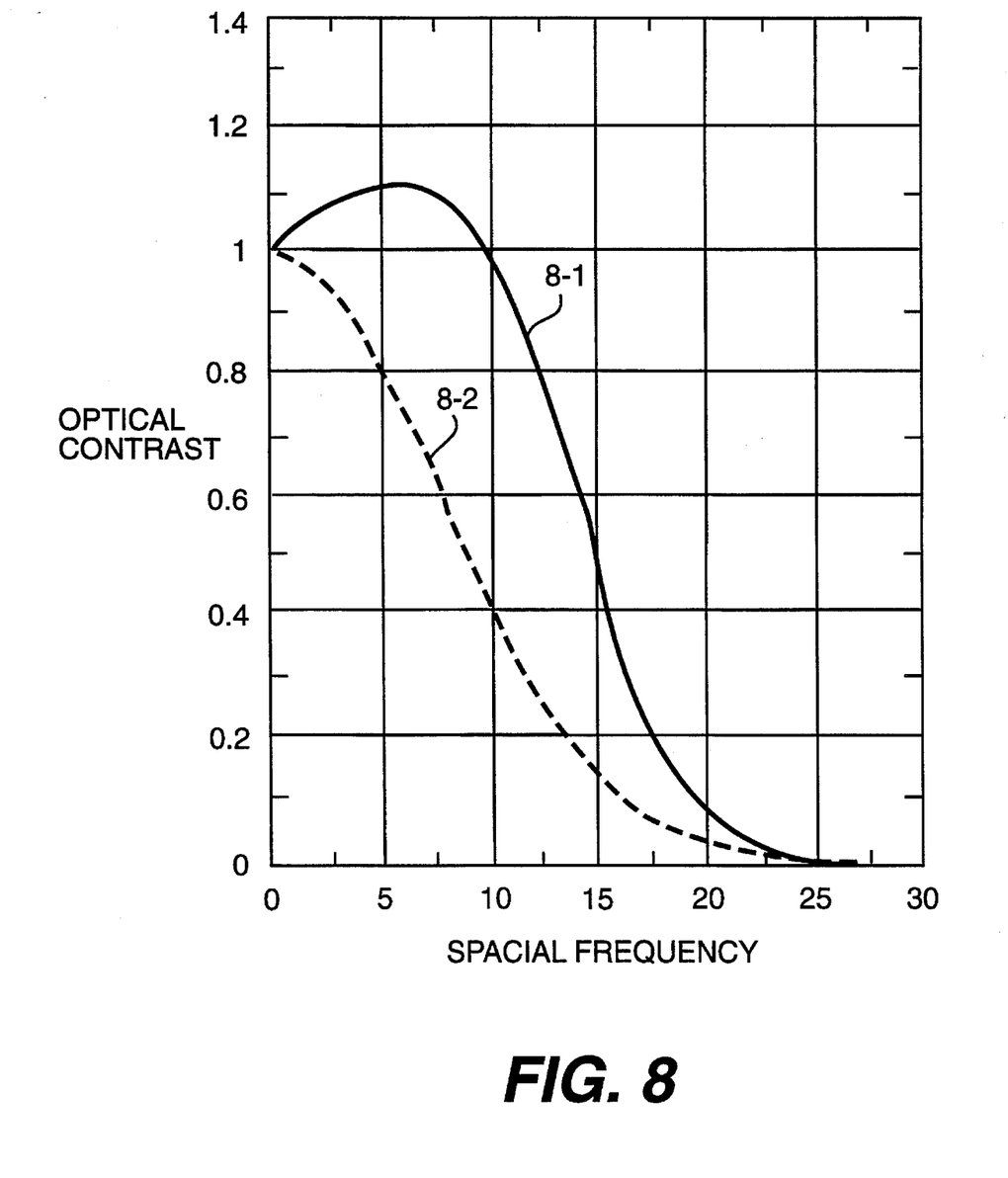
FIG. 8 shows the spatial frequency response of the optical system without an aperture means.

FIG. 7 illustrates the response for a carrier frequency of the acoustic optical modulator of the above described optical system, and the acoustic optical modulator of this embodiment has characteristics as shown by the continuous line 7-1. The frequency response obtained from this result is shown by a continuous line 8-1 in FIG. 8. The broken line 8-2 shows the spatial frequency response for the Gaussian distribution of the same laser beam having a diameter of 80 μm shown by a broken line 6-2 in FIG. 6.

Figure 9:
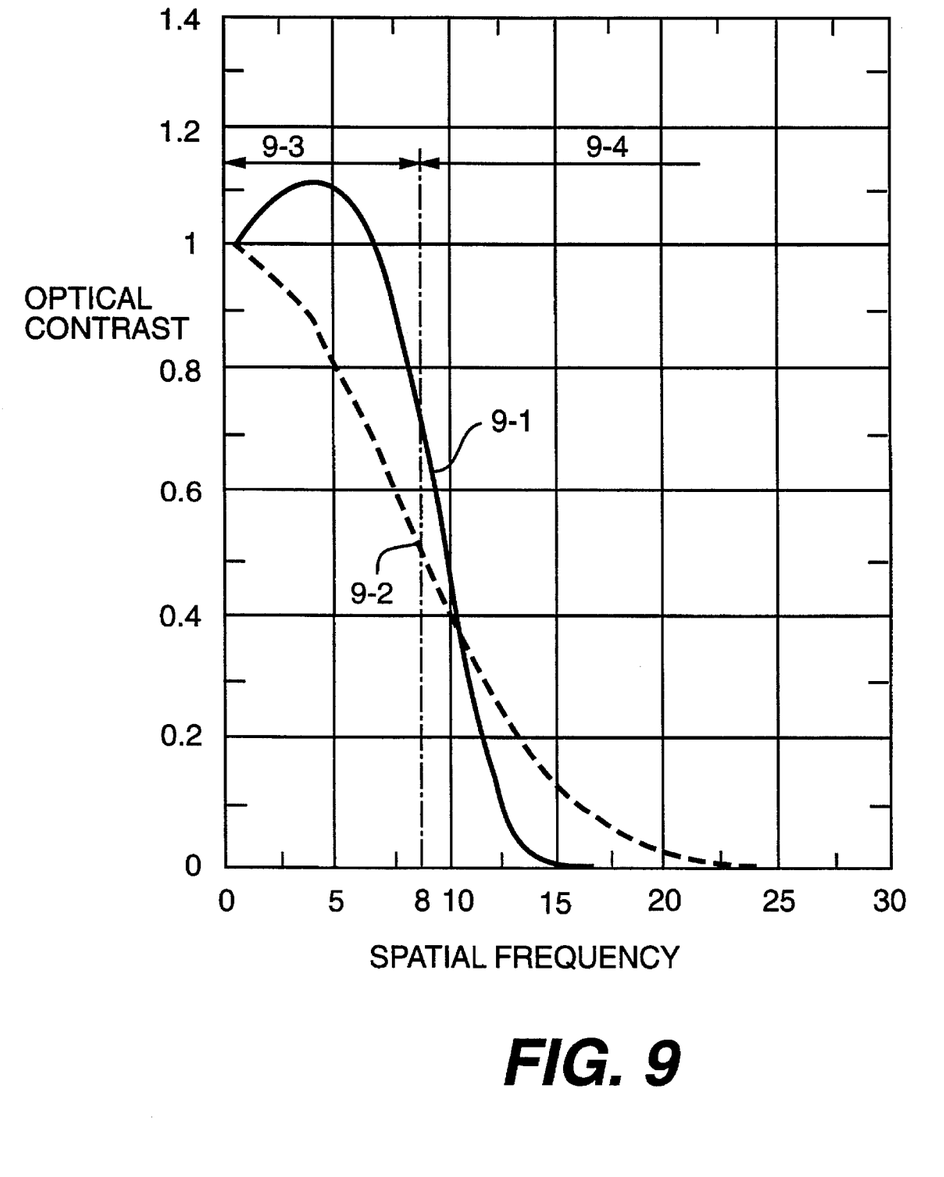
FIG. 9 shows the spatial frequency response of the optical system having an aperture means.

Further, if there is a high frequency noise causing factor in the circuit, the effective aperture A in the formula (2) is decreased, which means the aperture of the aperture means 5 is narrowed, and sharp frequency cut-off characteristics are obtained. For example, if the effective aperture A is:

$$A = t/75 \tag{2'}$$

as shown by a continuous line 9-1 in FIG. 9, in the required spatial frequency range 9-3 of up to 8 lp/mm, a high frequency response of 80 percent or more is obtained. In the unnecessary range 9-4, the frequency response suddenly declines, and especially in the range where the spatial frequency is more than approximately 10 lp/mm, the frequency response is considerably lower than that in the conventional art. This phenomenon is effective for removing high frequency noise superimposed in the circuit.

Thus, high cut-off characteristics in the unnecessary high frequency range can be obtained at the same time.

The above description applies only when the contrast of the input signal is 100 percent, so if this optical system is applied to a digital copying machine, data with high contrast may not necessarily be input.

As described in the above embodiment, this invention uses the coherence of an optical system having an acoustic optical modulator. This means that the spatial frequency response has a linear characteristic for light complex amplitude instead of having linear characteristics for spatial frequency response as in the conventional art.

On the other hand, as the beam intensity is the square of the absolute value of light complex amplitude, if the contract of the input signal is reduced to half, that of the output signal is reduced to a quarter. In another words, the optical system has the same response with a improved adaptive spatial frequency filter in which the input signal having a high contrast is converted to a higher contrast and the one having a low contrast is converted to lower one.

The acoustic optical modulator vibrates in the direction of progression of the acoustic wave inside it. This vibration decreases the resolution of the optical system especially when the spatial frequency is high. The optical system absorbs the above described vibration component by corresponding the direction of progression of the acoustic wave in the acoustic optical modulator, the direction of beam, which improve the resolution of the optical system. Sharp high-frequency cut-off characteristics are obtained by decreasing the effective aperture A.

Value of effective aperture A can be specified individually corresponding to the optical system response required by a printer specification or the like.

What is claimed is:

1. A laser scanner comprising:
   a laser beam emitter for emitting a laser beam;
   an acoustic optical modulator for modulating the laser beam emitted from the laser beam emitter into a primary diffracted beam by using acoustic waves propagating in an acoustic wave direction;
   a first optical member for collimating the primary diffracted beam from the acoustic optical modulator to form a collimated beam;
   aperture means for restricting the collimated beam in the acoustic wave direction;

beam deflecting means for deflecting the restricted beam to form a scanning beam;

a second optical member for focusing the scanning beam; and a receiving surface positioned in a conjugate position with respect to the first and the second optical members for receiving the focused scanning beam, wherein the acoustic optical modulator is positioned in a conjugate position with respect to the first and the second optical members.

2. A laser scanner of claim 1, further comprising a third optical member for condensing the laser beam emitted from the laser beam emitter and providing the condensed laser beam to the acoustic optical modulator.

3. A laser scanner of claim 1 wherein M represents lateral magnification obtained from the first and the second optical members, $V_1$ represents a scanning velocity of the scanning beam on the beam receiving surface, and $V_s$ represents a velocity of the acoustic wave inside the acoustic beam modulator and are substantially related by $$M = -V_1/V_s.$$

4. A laser scanner of claim 1, wherein the second optical member comprises and fθ lens.

* * * * *

UNITED STATES PATENT AND TRADEMARK OFFICE
CERTIFICATE OF CORRECTION

PATENT NO. : 5,457,567
DATED : October 10, 1995
INVENTOR(S) : Kouichirou SHINOHARA et al It is certified that error appears in the above-indentified patent and that said Letters Patent is hereby corrected as shown below:

Claim 4, Column 8, Line 12, "and" should read as --an--.

Signed and Sealed this

Thirteenth Day of August, 1996

Attest:

BRUCE LEHMAN

*Attesting Officer*      *Commissioner of Patents and Trademarks*